UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

FERTILIZER AND PROCESS OF MAKING SAME.

988,894.  Specification of Letters Patent.  Patented Apr. 4, 1911.

No Drawing.   Application filed September 2, 1909.   Serial No. 515,808.

*To all whom it may concern:*

Be it known that I, SAMUEL PEACOCK, a citizen of the United States, residing at Chicago, in the county of Cook and State of Illinois, have invented certain new and useful Improvements in Processes of Neutralizing Commercial Cyanamid; and I do hereby declare the following to be a full, clear, and exact description of the invention, such as will enable others skilled in the art to which it appertains to make and use the same.

This invention relates to a process of rendering commercial calcium cyanamid neutral, or acid, as may be desired employing for that purpose a solution of phosphoric acid, and accomplishing the same in a simple and comparatively inexpensive manner.

To this end, the invention consists in the novel steps, and combination of steps constituting my process, more fully hereinafter disclosed, and particularly pointed out in the claims.

Calcium cyanamid as produced commercially contains about twenty (20) per cent. uncombined lime, or calcium oxid (CaO), and upon unavoidable exposure to the atmosphere during storage or upon shipment, this caustic lime absorbs moisture, causing more or less distortion of packages, and also adding to the weight of the commercial material. It has also been claimed that when commercial calcium cyanamid is mixed with acid phosphates in the manufacture of commercial fertilizers, more or less of the free lime of the cyanamid reacts with the phosphoric acid in the acid phosphate, causing a reversion of the phosphoric acid, and consequently a loss in the availability of the same as an immediately active plant food. I am aware that it has been proposed to destroy the basic character of this free lime in calcium cyanamid, by combining the same with sulfuric acid, whereby sulfate of lime is formed from the free lime; a form of lime which cannot cause a reversion of the phosphoric acid in acid phosphates. But there are more or less objections to such a use of sulfuric acid. The sulfuric acid thus added to the calcium cyanamid has in the opinion of many no agricultural value; and it merely adds to the weight the farmer must move, and to the price he must pay, for a given amount of plant food. It is further claimed that supplying sulfuric acid in such a form, to the soil year after year, results in a very material injury to the crop producing power of the soil, as has been demonstrated in various experiments in applied agricultural science.

The object of this invention more specifically stated is to neutralize the free lime in calcium cyanamid, by using phosphoric acid for this purpose; and, thereby eliminating the more or less unfavorable basic nature of the commercial material; and in doing so furthermore, I add to the cyanamid an essential element of plant food, (phosphoric acid), in a form readily available to the assimilating powers of growing plants.

When treating calcium cyanamid with an acid, the object being to neutralize the free lime only, care must be observed not to use an excess of acid for the purpose required; although of course a slight excess may be used if the cyanamid is to be rendered acid. Also, the temperature of the mixture during the process of acidulation must be kept below the boiling point of water, else decomposition of the cyanamid may occur, and some combined nitrogen be lost.

I have discovered that by using phosphoric acid containing not greatly exceeding 70 per cent. of phosphorus pentoxid $P_2O_5$, and finely ground calcium cyanamid $CaCN_2$, and mixing the same together thoroughly in masses not exceeding 1000 pounds of calcium cyanamid, the temperature of the mass may be kept below the boiling point of water, and the free lime of the cyanamid may be wholly converted into available calcium phosphate, without loss of any substantial amount of combined nitrogen.

The resulting material, which I designate as phosphated cyanamid, is friable, does not cake, and is in every way unusually suitable as a high grade nitrogenous phosphatic fertilizer, and one also largely free from useless or deleterious substances.

The process of treatment consists of intimately and rapidly mixing in any suitable vessel a weighed quantity of calcium cyanamid, and sufficient phosphoric acid (not greatly exceeding a content of 70 per cent. phosphorus pentoxid), to chemically combine with at least fifty per cent. of the free lime in the calcium cyanamid and in the proportion of one equivalent of free lime combined to one equivalent of phosphoric acid. The reaction begins at ordinary temperatures and the stirring or mixing should be continued until there is no further evolution of heat, when the reactions will be found to have been completed. Further, the temperature of the mass should not be permitted to rise above 150° C. That is to say for each 100 pounds of crude lime nitrogen I may use about 113 pounds of phosphoric acid ($3H_2O.P_2O_5$.); and the lime nitrogen above mentioned contains a nitrogen equivalent of about 22 per cent. ammonia.

The usefulness of my process is demonstrated by the following analyses which show the composition of the product resulting from the treatment of calcium cyanamid with sulfuric acid and with phosphoric acid.

|  | Sulfuric acid treatment. | Phosphoric acid treatment. |
|---|---|---|
| Ammonia | 16 | 16 |
| Available phosphoric acid | None | 22 |
| Sulfur | 10.61 | None |

The resulting product is not only a high grade ammoniate, but also an acid phosphate of a higher grade than the best commercial acid phosphate.

What I claim is:

1. The process of forming a fertilizer which consists in mixing a sufficient amount of phosphoric acid with commercial calcium cyanamid to convert at least one-half of the free lime present into calcium phosphate, while preventing the temperature from rising to a point at which any substantial amount of ammonia will be given off, substantially as described.

2. The process of forming a fertilizer which consists in mixing a sufficient amount of phosphoric acid with calcium cyanamid containing free lime, to convert substantially all of the free lime present into calcium phosphate and thereby preventing the temperature from rising to a point at which any substantial amount of ammonia will be given off, substantially as described.

3. The process of forming a fertilizer substantially free from lime which consists in mixing with commercial calcium cyanamid containing free lime sufficient phosphoric acid to neutralize the lime, while maintaining the temperature below the point at which ammonia will be driven off, substantially as described.

4. The herein described fertilizer consisting of a mixture of calcium phosphate and calcium cyanamid substantially free from lime, substantially as described.

In testimony whereof, I affix my signature, in presence of two witnesses.

SAMUEL PEACOCK.

Witnesses:
T. A. WITHERSPOON,
GEO. B. PITTS.